(12) United States Patent
Qiu et al.

(10) Patent No.: US 11,796,738 B2
(45) Date of Patent: Oct. 24, 2023

(54) TEMPERATURE-INSENSITIVE MACH-ZEHNDER INTERFEROMETER

(71) Applicant: SHANGHAI INSTITUTE OF MICROSYSTEM AND INFORMATION TECHNOLOGY, CHINESE ACADEMY OF SCIENCES, Shanghai (CN)

(72) Inventors: Chao Qiu, Shanghai (CN); Yingxuan Zhao, Shanghai (CN); Fuwan Gan, Shanghai (CN); Aimin Wu, Shanghai (CN); Zhen Sheng, Shanghai (CN); Wei Li, Shanghai (CN)

(73) Assignee: SHANGHAI INSTITUTE OF MICROSYSTEM AND INFORMATION TECHNOLOGY, CHINESE ACADEMY OF SCIENCES, Shanghai (CN)

( * ) Notice: Subject to any disclaimer, the term of this patent is extended or adjusted under 35 U.S.C. 154(b) by 201 days.

(21) Appl. No.: 17/312,393

(22) PCT Filed: Jan. 3, 2019

(86) PCT No.: PCT/CN2019/070284
§ 371 (c)(1),
(2) Date: Dec. 23, 2021

(87) PCT Pub. No.: WO2020/118807
PCT Pub. Date: Jun. 18, 2020

(65) Prior Publication Data
US 2022/0120973 A1      Apr. 21, 2022

(30) Foreign Application Priority Data

Dec. 10, 2018   (CN) .......................... 201811501015.0
Dec. 10, 2018   (CN) .......................... 201822059191.5

(51) Int. Cl.
*G02B 6/293*      (2006.01)
*G01B 9/02056*   (2022.01)

(52) U.S. Cl.
CPC ....... *G02B 6/2935* (2013.01); *G01B 9/02056* (2013.01)

(58) Field of Classification Search
None
See application file for complete search history.

(56) References Cited

U.S. PATENT DOCUMENTS

5,933,554 A  *  8/1999  Leuthold ................. G02F 2/004
                                                              385/9
11,048,052 B2 *  6/2021  Li .......................... G02B 6/126
(Continued)

*Primary Examiner* — Jerry Rahll (57) ABSTRACT

The present invention provides a temperature-insensitive Mach-Zehnder interferometer, including: a first mode converter; a second mode converter, located on one side of the first mode converter and with a distance from the first mode converter; and a connecting arm, located between the first mode converter and the second mode converter, one end of the connecting arm is connected with the first mode converter, and the other end is connected with the second mode converter. The connecting arm includes a straight waveguide connecting arm. The temperature-insensitive Mach-Zehnder interferometer of the present invention can be configured to be insensitive to temperature by adjusting parameters such as the width and thickness of the connecting arm.

9 Claims, 5 Drawing Sheets

(56) References Cited

U.S. PATENT DOCUMENTS

| | | | |
|---|---|---|---|
| 2003/0151796 A1* | 8/2003 | Kim | G02F 2/004 385/27 |
| 2011/0116802 A1* | 5/2011 | Kamei | G02B 6/29352 398/87 |
| 2016/0131836 A1* | 5/2016 | Matsumoto | G02B 6/29355 385/11 |
| 2021/0088736 A1* | 3/2021 | Li | G02B 6/4213 |

* cited by examiner

TEMPERATURE-INSENSITIVE MACH-ZEHNDER INTERFEROMETER

CROSS REFERENCE TO RELATED APPLICATION

This is a Sect. 371 National Stage of PCT International Application No. PCT/CN2019/070284, filed on Jan. 3, 2019, which claims the benefit of priority to Chinese Patent Application No. CN 2018220591915, entitled "TEMPERATURE-INSENSITIVE MACH-ZEHNDER INTERFEROMETER", filed with CNIPA on Dec. 10, 2018, and Chinese Patent Application No. CN 2018115010150, entitled "TEMPERATURE-INSENSITIVE MACH-ZEHNDER INTERFEROMETER", filed with CNIPA on Dec. 10, 2018, the disclosure of which is incorporated herein by reference in their entireties.

FIELD OF TECHNOLOGY

The present invention relates to optical technology, in particular, to a temperature-insensitive Mach-Zehnder interferometer.

BACKGROUND

Mach-Zehnder Modulator is widely used in technical fields such as optical signal modulation. The existing Mach-Zehnder interferometers basically adopt a double-arm structure, and they are generally sensitive to temperature, have complex structures, and are large in size.

SUMMARY

The present disclosure provides a temperature-insensitive Mach-Zehnder interferometer, which is used to solve the problems of the traditional Mach-Zehnder interferometers that they are generally sensitive to temperature, have complex structures, and are large in size.

The present disclosure provides a temperature-insensitive Mach-Zehnder interferometer, which includes: a first mode converter; a second mode converter, located on one side of the first mode converter and with a distance from the first mode converter; and a connecting arm, located between the first mode converter and the second mode converter, with one end of the connecting arm connected to the first mode converter, and the other end connected to the second mode converter. The connecting arm also includes a straight waveguide connecting arm.

As an embodiment of the present disclosure, the first mode converter includes: an input waveguide, a first asymmetric tapered waveguide, a first straight waveguide, and a second asymmetric tapered waveguide. The input waveguide, the first An asymmetric tapered waveguide, the straight waveguide and the second asymmetric tapered waveguide are connected in sequence; the second asymmetric tapered waveguide is connected with the connecting arm.

The second mode converter includes a third asymmetric tapered waveguide, a second straight waveguide, a fourth asymmetric tapered waveguide, and an output waveguide. The third asymmetric tapered waveguide, the second straight waveguide, the fourth asymmetric tapered waveguide, and the output waveguide are connected in sequence; the third asymmetric tapered waveguide is connected with the connecting arm.

As an embodiment of the present disclosure, one end of the first asymmetric tapered waveguide is a narrow end face, and the other end is a wide end face. The narrow end face of the first asymmetric tapered waveguide is connected to the input waveguide. The wide end face of the first asymmetric tapered waveguide is connected to the first straight waveguide.

One end of the second asymmetric tapered waveguide is a narrow end face, and the other end is a wide end face. The wide end face of the second asymmetric tapered waveguide is connected to the first straight waveguide. The second asymmetric tapered waveguide is connected to the first straight waveguide. The narrow end face of the second asymmetric tapered waveguide is connected with the connecting arm;

One end of the third asymmetric tapered waveguide is a narrow end face, and the other end is a wide end face. The narrow end face of the third asymmetric tapered waveguide is connected to the connecting arm. The wide end face of the third asymmetric tapered waveguide is connected to the second straight waveguide.

One end of the fourth asymmetric tapered waveguide is a narrow end face, and the other end is a wide end face. The wide end face of the fourth asymmetric tapered waveguide is connected to the second straight waveguide. The narrow end face of the fourth asymmetric tapered waveguide is connected to the output waveguide.

As an embodiment of the present disclosure, the width of the wide end face of the first asymmetric tapered waveguide and the width of the wide end face of the second asymmetric tapered waveguide are the same as the width of the first straight waveguide, and the width of the wide end surface of the third asymmetric tapered waveguide and the width of the wide end surface of the fourth asymmetric tapered waveguide are the same as the width of the second straight waveguide.

As an embodiment of the present disclosure, the width of the input waveguide is 0.45 μm to 0.55 μm; the width of the wide end surface of the first asymmetric tapered waveguide is 2.1 μm to 2.2 μm, the width of the narrow end surface of the first asymmetric tapered waveguide is 0.45 μm to 0.55 μm, and the length of the first asymmetric tapered waveguide is 8.05 μm to 8.15 μm; the width of the first straight waveguide is 2.1 μm to 2.2 μm, and the length of the first straight waveguide is 4.95 μm to 5.05 μm; the width of the wide end surface of the second asymmetric tapered waveguide is 2.1 μm to 2.2 μm, the width of the narrow end surface of the second asymmetric tapered waveguide is 1.15 μm to 1.25 μm, and the length of the second asymmetric tapered waveguide is 6.25 μm ~6.35 μm; the width of the wide end surface of the third asymmetric tapered waveguide is 2.1 μm to 2.2 μm, the width of the narrow end surface of the third asymmetric tapered waveguide is 1.15 μm to 1.25 μm, and the length of the third asymmetric tapered waveguide is 6.25 μm to 6.35 μm; the width of the second straight waveguide is 2.1 μm to 2.2 μm, and the length of the second straight waveguide is 4.95 μm to 5.05 μm; the width of the wide end face of the fourth asymmetric tapered waveguide is 2.1 μm to 2.2 μm, the width of the narrow end face of the fourth asymmetric tapered waveguide is 0.45 μm to 0.55 μm, and the length of the fourth asymmetric tapered waveguide is 8.05 μm to 8.15 μm; the width of the output waveguide is 0.45 μm to 0.55 μm.

As an embodiment of the present disclosure, the thickness of the first mode converter, the thickness of the second mode converter, and the thickness of the connecting arm are all 215 nm to 225 nm.

As an embodiment of the present disclosure, the temperature-insensitive Mach-Zehnder interferometer further comprises a first inverted tapered coupler and a second inverted tapered coupler; the first inverted tapered coupler includes two input ends and an output end, and the output end of the first inverted tapered coupler is connected with an end of the first mode converter that is away from the connecting arm; the second inverted tapered coupler includes an input end and two output ends, and the input end of the second inverted tapered coupler is connected to an end of the second mode converter that is away from the connecting arm.

As an embodiment of the present disclosure, the temperature-insensitive Mach-Zehnder interferometer further comprises a substrate, and the substrate includes a bottom silicon layer, and a buried oxide layer in a Silicon on Insulator (SOI) substrate. The first mode converter, the connecting arm and the second mode converter are all formed by etching a top silicon layer in the SOI substrate.

As an embodiment of the present disclosure, the temperature-insensitive Mach-Zehnder interferometer further includes a protective layer located on a top surface of the buried oxide layer and covering the first mode converter, the connecting arm, and the second mode converter.

As an embodiment of the present disclosure, the width of the connecting arm is 646 nm.

As mentioned above, the temperature-insensitive Mach-Zehnder interferometer of the present disclosure has the following beneficial effects:

The structure of the present disclosure's temperature-insensitive Mach-Zehnder interferometer is prepared based on an SOI substrate, and the silicon in the SOI substrate has a large thermo-optical coefficient (up to $1.86 \times 10^{-4}$ RIU/K, wherein RIU is a refractive index unit), which can cause a considerable wavelength shift when temperature changes (about 80 pm/K). On this basis, the width and thickness of the connecting arm can be set to achieve temperature insensitivity; at the same time, the temperature-insensitive Mach-Zehnder interferometer of the present disclosure can be compatible with CMOS process, which facilitates mass production.

The temperature-insensitive Mach-Zehnder interferometer of present disclosure can output both TE0 mode and TE1 mode light, whether the input end receives TE0 mode or TE1 mode incident light.

The two mode converters in the temperature-insensitive Mach-Zehnder interferometer of the present disclosure are connected by a connecting arm, which has a simple structure and low loss.

The width of the straight waveguide in the asymmetric tapered waveguide of the temperature-insensitive Mach-Zehnder interferometer of the present disclosure can be adjusted in a large range (±50 nm) without affecting the performance of the device, which is suitable for high quality mass production implemented on a silicon photonics process platform.

BRIEF DESCRIPTION OF THE DRAWINGS

FIGS. 1 to 3 show schematic structural diagrams of a temperature-insensitive Mach-Zehnder interferometer provided by the present disclosure; among them.

FIGS. 7 and 8 are incident-light-wavelength-versus-input-loss graphs of a temperature-insensitive Mach-Zehnder interferometer provided by the present disclosure under two different temperature conditions of 26.85° C. and 56.85° C.; in FIG. 7, the length of the connecting arm is 560 µm, the incident light is in TE0 mode, and the output light is in TE0 mode; in FIG. 8, the length of the connecting arm is 1100 µm, the incident light is in TE0 mode, and the output light is in TE0 mode.

FIGS. 9 to 12 are connecting-arm-length-versus-input-loss graphs of the temperature-insensitive Mach-Zehnder interferometer provided by the present disclosure; in FIG. 9 and FIG. 10, the incident light is in TE0 mode, and the output light is in TE0 Mode and TE1 mode; in FIG. 11 and FIG. 12, the incident light is in TE1 mode, and the output light is in TE0 mode and TE1 mode; in FIG. 9 to FIG. 12, the curve 1) refers to when the width of the first straight waveguide or the second straight waveguide is 2150 nm, the curve 2) refers to when the width of the first straight waveguide or the second straight waveguide is 2100 nm, and the curve 3) refers to when the width of the first straight waveguide or the second straight waveguide is 2200 nm.

REFERENCE NUMERALS

10 first mode converter
101 input waveguide
102 first asymmetric tapered waveguide
103 first straight waveguide
104 second asymmetric tapered waveguide
11 second mode converter
111 third asymmetric tapered waveguide
112 second straight waveguide
113 fourth asymmetric tapered waveguide
114 output waveguide
12 connecting arm
13 first inverted tapered coupler
14 second inverted tapered coupler
15 substrate
151 bottom silicon layer
152 buried oxide layer
16 protective layer

DETAILED DESCRIPTION

The following specific embodiments illustrate the implementation of the present disclosure. Those familiar with this technology can easily understand the other advantages and effects of the present disclosure from the content disclosed in this specification.

Please refer to FIG. 1 to FIG. 11. It should be noted that the structures, proportions, sizes, etc. shown in the accompanying drawings in this specification are only used to illustrate the content disclosed in the specification for people familiar with this technology to understand and read, and are not used to limit the implementation of the present disclosure. Any structural modification, proportional relationship change, or size adjustment without affecting the effects and objectives achievable by the present disclosure should still fall into the scope of the present disclosure. At the same time, the terms such as "upper", "lower", "left", "right", "middle" and "one" cited in this specification are only used for ease of description, and are not to limit the scope of implementation of the present disclosure, and the change or adjustment of the relative relationships herein without substantial changes to the technical content shall also be regarded as within the scope of implementation of the present disclosure.

Figure 1:
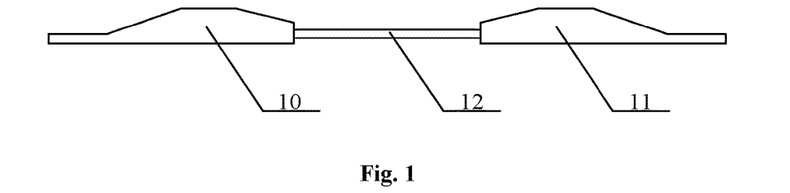
FIG. 1 and FIG. 3 are top-view structural schematic diagrams of two different exemplary temperature-insensitive Mach-Zehnder interferometers and FIGS. 2 shows a three-dimensional schematic diagram of an exemplary temperature-insensitive Mach-Zehnder interferometer.

Please refer to FIG. 1. The present disclosure provides a temperature-insensitive Mach-Zehnder interferometer. The temperature-insensitive Mach-Zehnder interferometer includes: a first mode converter 10; a second mode converter 11, located on one side of the first mode converter 10 and with a distance from the first mode converter 10; and a connecting arm 12, located between the first mode converter 10 and the second mode converter 11, with one end of the connecting arm 12 connected to the first mode converter 10, and the other end connected to the second mode converter 11. The connecting arm 12 includes a straight waveguide connecting arm.

Figure 2:
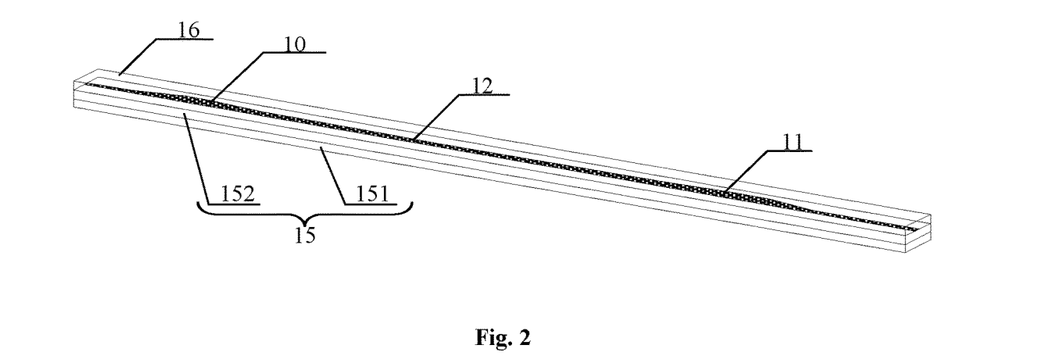
Figure 3:
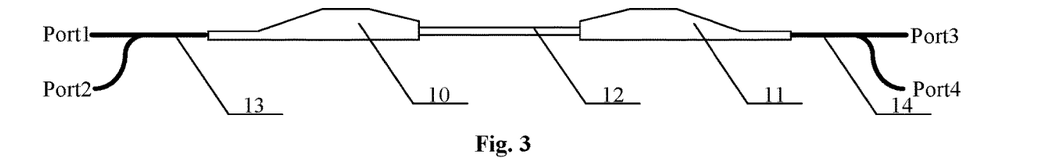

As an example, as shown in FIGS. 2 and 3, the temperature-insensitive Mach-Zehnder interferometer also includes a first inverted tapered coupler 13 and a second inverted tapered coupler 14. The first inverted tapered coupler 13 includes two input ends (Port 1 and Port 2 in FIG. 3) and an output end. The output end of the first inverted tapered coupler 13 is connected to the end of the first mode converter 10 away from the connecting arm 12. The second inverted tapered coupler 14 includes an input end and two output ends (Port 3 and Port 4 in FIG. 3). The input end of the second inverted tapered coupler 14 is connected to the end of the second mode converter 11 away from the connecting arm 12.

As an example, as shown in FIG. 2, the temperature-insensitive Mach-Zehnder interferometer further includes a substrate 15. The substrate 15 includes a bottom silicon layer 151 and a buried oxide layer 152 in an SOI substrate. The first mode converter 10, the connecting arm 12, and the second mode converter 11 are all formed by etching a top silicon layer in the SOI substrate. The first mode converter 10, the connecting arm 12, and the second mode converter 11 in the temperature-insensitive Mach-Zehnder interferometer of the present disclosure are prepared based on the SOI substrate. The thermo-optic coefficient of silicon in the SOI substrate is very large (it can reach $1.86 \times 10^{-4}$ RIU/K, where RIU is the unit of refractive index), which can cause a considerable wavelength shift with temperature changes (about 80 pm/K). Therefore, by adjusting parameters such as the width and thickness of the connecting arm 12, it is possible to achieve temperature insensitivity; at the same time, the temperature-insensitive Mach-Zehnder interferometer of the present disclosure can be compatible with the CMOS process, which is convenient for mass production.

As an example, as shown in FIG. 2, the temperature-insensitive Mach-Zehnder interferometer further includes a protective layer 16, which is located on a top surface of the buried oxide layer 152 and covers the first mode converter 10, the connecting arm 12, and the second mode converter 11, to protect the first mode converter 10, the connecting arm 12 and the second mode converter 11. The protective layer 16 may include but is not limited to a silicon oxide layer.

Figure 4:
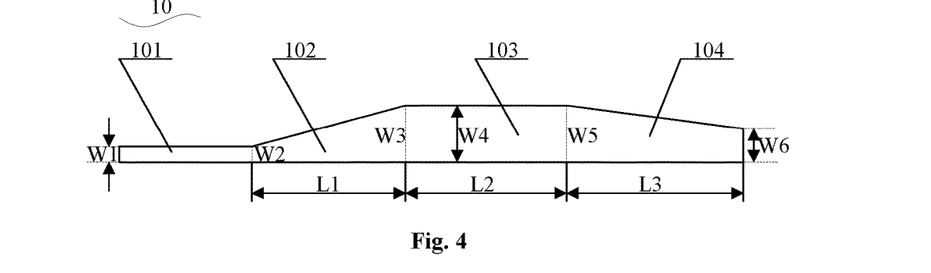
FIG. 4 shows a schematic top view of a first mode converter in a temperature-insensitive Mach-Zehnder interferometer provided by the present disclosure.

As an example, as shown in FIG. 4, the first mode converter 10 includes: an input waveguide 101, a first asymmetric tapered waveguide 102, a first straight waveguide 103, and a second asymmetric tapered waveguide 104; the input waveguide 101, the first asymmetric tapered waveguide 102, the straight waveguide 103, and the second asymmetric tapered waveguide 104 are sequentially connected; the second asymmetric tapered waveguide 104 is connected to the first straight waveguide 103, and specifically, the end of the second asymmetric tapered waveguide 104 away from the first straight waveguide 103 is connected with the connecting arm 12.

Figure 5:
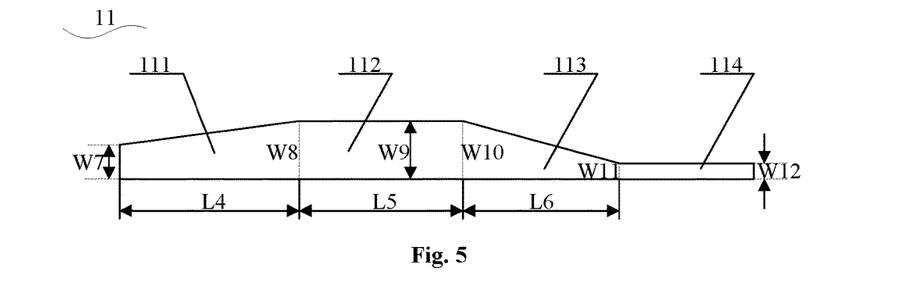
FIG. 5 shows a schematic top view of a second mode converter in a temperature-insensitive Mach-Zehnder interferometer provided by the present disclosure.

As an example, as shown in FIG. 5, the second mode converter 11 includes a third asymmetric tapered waveguide 111, a second straight waveguide 112, a fourth asymmetric tapered waveguide 113, and an output waveguide 114; the third asymmetric tapered waveguide 111, the second straight waveguide 112, the fourth asymmetric tapered waveguide 113, and the output waveguide 114 are sequentially connected; the third asymmetric tapered waveguide 111 is connected to the connecting arm 12.

As an example, as shown in FIG. 4, one end of the first asymmetric tapered waveguide 102 is a narrow end face, and the other end of the first asymmetric tapered waveguide 102 is a wide end face. The narrow end face of the waveguide 102 is connected to the input waveguide 101, the wide end face of the first asymmetric tapered waveguide 102 is connected to the first straight waveguide 103. One end of the second asymmetric tapered waveguide 104 is a narrow end surface, the other end of the second asymmetric tapered waveguide 104 is a wide end surface, the wide end surface of the second asymmetric tapered waveguide 104 is connected to the first straight waveguide 103, and the narrow end face of the second asymmetrical tapered waveguide 104 is connected to the connecting arm 12.

As an example, as shown in FIG. 5, one end of the third asymmetric tapered waveguide 111 is a narrow end face, the other end of the third asymmetric tapered waveguide 111 is a wide end face. The narrow end face of the waveguide 111 is connected to the connecting arm 12, the wide end face of the third asymmetric tapered waveguide 111 is connected to the second straight waveguide 112. One end of the fourth asymmetric tapered waveguide 113 is a narrow end surface, the other end of the fourth asymmetric tapered waveguide 113 is a wide end surface, the wide end surface of the fourth asymmetric tapered waveguide 113 is connected to the second straight waveguide 112, and the narrow end face of the fourth asymmetrical tapered waveguide 113 is connected to the output waveguide 114.

As an example, the width W3 of the wide end face of the first asymmetric tapered waveguide 102 and the width W5 of the wide end face of the second asymmetric tapered waveguide 104 are the same as the width W4 of the first straight waveguide 103. The width W8 of the wide end surface of the third asymmetric tapered waveguide 111 and the width W10 of the wide end surface of the fourth asymmetric tapered waveguide 113 are the same as the width W9 of the second straight waveguide 112.

With the first asymmetric tapered waveguide 102, the second asymmetric tapered waveguide 104, the third asymmetric tapered waveguide 111, and the fourth asymmetric tapered waveguide 113, due to the asymmetry of the structure of the first mode converter 10 and the second mode converter 11 in the y direction (that is, the width direction of the first straight waveguide 103 and the width direction of the second straight waveguide 112), when the incident light in the TE0 mode passes through the first mode converter 10 and the second mode converter 11, it will be transmitted at different effective lengths. By setting the width of the first straight waveguide 103 and the width of the second straight waveguide 112, the incident light of in TE0 mode may be prevented from being completely converted into the TE1 mode, so that the output light is of a mixed mode including the TE0 mode and the TE1 mode.

As an example, the width of the input waveguide is 0.45 μm to 0.55 μm; the width of the wide end face of the first asymmetric tapered waveguide is 2.1 μm to 2.2 μm, the width of the narrow end face of the first asymmetric tapered waveguide is 0.45 μm to 0.55 μm, and the length of the first asymmetric tapered waveguide is 8.05 μm to 8.15 μm; the width of the first straight waveguide is 2.1 82 m to 2.2 μm, and the length of the first straight waveguide is 4.95 μm to 5.05 μm; the width of the wide end surface of the second asymmetric tapered waveguide is 2.1 μm to 2.2 μm, the width of the narrow end surface of the second asymmetric tapered waveguide is 1.15 μm to 1.25 μm, and the length of the second asymmetric tapered waveguide is 6.25 μm to 6.35 μm; the width of the wide end face of the third asymmetric tapered waveguide is 2.1 μm to 2.2 μm, the width of the narrow end face of the third asymmetric tapered waveguide is 1.15 μm to 1.25 μm, and the length of the third asymmetric tapered waveguide is 6.25 μm to 6.35 μm; the width of the second straight waveguide is 2.1 μm to 2.2 μm, and the length of the second straight waveguide is 4.95 μm to 5.05 μm; the width of the wide end face of the fourth asymmetric tapered waveguide is 2.1 μm to 2.2 μm, the width of the narrow end face of the fourth asymmetric tapered waveguide is 0.45 μm to 0.55 μm, the length of the fourth asymmetric tapered waveguide is 8.05 μm to 8.15 μm; the width of the output waveguide is 0.45 μm to 0.55 μm.

It should be noted that the above-mentioned dimensional parameters need to have a one-to-one correspondence within the above-mentioned ranges, and several embodiments are described below for illustration:

For example, in a first embodiment, the width W1 of the input waveguide 101 is 0.5 μm; the width W3 of the wide end face of the first asymmetric tapered waveguide 102 is 1.9 μm, the width W2 of the narrow end face of the first asymmetric tapered waveguide 102 is 0.5 μm, and the length L1 of the first asymmetric tapered waveguide 102 is 7.6 μm; the width W4 of the first straight waveguide 103 may be 1.9 μm, and the length L2 of the first straight waveguide 103 may be 3.6 μm; the width W5 of the wide end face of the second asymmetric tapered waveguide 104 may be 1.9 μm, the width W6 of the narrow end face of the second asymmetric tapered waveguide 104 may be 1.2 μm, and the length L3 of the second asymmetric tapered waveguide 104 may be 5.1 μm; the width W8 of the wide end face of the third asymmetric tapered waveguide 111 is 1.9 μm, the width W7 of the narrow end face of the third asymmetric tapered waveguide 111 is 1.2 μm, and the length L4 of the third asymmetric tapered waveguide 111 is 5.1 μm; the width W9 of the second straight waveguide 112 is 1.9 μm, and the length L5 of the second straight waveguide 112 is 3.6 μm; the width W10 of the wide end face of the fourth asymmetric tapered waveguide 113 may be 1.9 μm; the width W11 of the narrow end face of the fourth asymmetric tapered waveguide 113 may be 0.5 μm, the length L6 of the fourth asymmetric tapered waveguide 113 may be 7.6 μm; and the width W12 of the input waveguide 114 may be 0.5 μm.

In a second embodiment, the width W1 of the input waveguide 101 is 0.5 μm; the width W3 of the wide end surface of the first asymmetric tapered waveguide 102 is 1.95 μm, the width W2 of the narrow end surface of the first asymmetric tapered waveguide 102 is 0.5 μm, and the length L1 of the first asymmetric tapered waveguide 102 is 7.6 μm; the width W4 of the first straight waveguide 103 may be 1.95 μm, and the length L2 of the first straight waveguide 103 may be 3.6 μm; the width W5 of the wide end surface of the second asymmetric tapered waveguide 104 may be 1.95 μm, the width W6 of the narrow end surface of the second asymmetric tapered waveguide 104 may be 1.2 μm, and the length L3 of the second asymmetric tapered waveguide 104 may be is 5.1 μm; the width W8 of the wide end surface of the third asymmetric tapered waveguide 111 is 1.95 μm, the width W7.6 of the narrow end surface of the third asymmetric tapered waveguide 111 is 1.2 μm, and the length L4 of the third asymmetric tapered waveguide 111 is 5.1 μm; the width W9 of the second straight waveguide 112 is 1.95 μm, and the length L5 of the second straight waveguide 112 is 3.6 μm; the width W10 of the wide end surface of the fourth asymmetric tapered waveguide 113 may be 1.95 μm, the width W11 of the narrow end surface of the fourth asymmetric tapered waveguide 113 may be 0.5 μm, and the length L6 of the fourth asymmetric tapered waveguide 113 may be 7.6 μm; the width W12 of the input waveguide 114 may be 0.5 μm.

In a third embodiment, the width W1 of the input waveguide 101 is 0.5 μm; the width W3 of the wide end surface of the first asymmetric tapered waveguide 102 is 2.05 μm, the width W2 of the narrow end surface of the first asymmetric tapered waveguide 102 is 0.5 μm, and the length L1 of the first asymmetric tapered waveguide 102 is 7.6 μm; the width W4 of the first straight waveguide 103 may be 2.05 μm, and the length L2 of the first straight waveguide 103 may be 3.6 μm; the width W5 of the wide end surface of the second asymmetric tapered waveguide 104 may be 2.05 μm, the width W6 of the narrow end surface of the second asymmetric tapered waveguide 104 may be 1.2 μm, and the length L3 of the second asymmetric tapered waveguide 104 may be 5.1 μm; the width W8 of the wide end surface of the third asymmetric tapered waveguide 111 is 2.05 μm, the width W7.9 of the narrow end surface of the third asymmetric tapered waveguide 111 is 1.2 μm, and the length L4 of the third asymmetric tapered waveguide 111 is 5.1 μm; the width W9 of the second straight waveguide 112 is 2.05 μm, and the length L5 of the second straight waveguide 112 is 3.6 μm; the width W10 of the wide end surface of the fourth asymmetric tapered waveguide 113 may be 2.05 μm, the width W11 of the narrow end surface of the fourth asymmetric tapered waveguide 113 may be 0.5 μm, and the length L6 of the fourth asymmetric tapered waveguide 113 may be 7.6 μm; the width W12 of the input waveguide 114 may be 0.5 μm.

In a fourth embodiment, the width W1 of the input waveguide 101 is 0.5 μm; the width W3 of the wide end surface of the first asymmetric tapered waveguide 102 is 2.15 μm, the width W2 of the narrow end surface of the first asymmetric tapered waveguide 102 is 0.5 μm, and the length L1 of the first asymmetric tapered waveguide 102 is 8.1 μm; the width W4 of the first straight waveguide 103 may be 2.15 μm, and the length L2 of the first straight waveguide 103 may be 5 μm; the width W5 of the wide end surface of the second asymmetric tapered waveguide 104 may be 2.15 μm, the width W6 of the narrow end surface of the second asymmetric tapered waveguide 104 may be 1.2 μm, and the length L3 of the second asymmetric tapered waveguide 104 may be 6.3 μm; the width W8 of the wide end face of the third asymmetric tapered waveguide 111 is 2.15 μm, the width W8.1 of the narrow end face of the third asymmetric tapered waveguide 111 is 1.2 μm, and the length L4 of the third asymmetric tapered waveguide 111 is 6.3 μm; the width W9 of the second straight waveguide 112 is 2.15 μm, and the length L5 of the second straight waveguide 112 is 5 μm; the width W10 of the wide end surface of the fourth asymmetric tapered waveguide 113 may be 2.15 μm, the width W11 of the narrow end surface of the fourth asymmetric tapered waveguide 113 may be 0.5 μm, and the length L6 of the fourth asymmetric tapered waveguide 113 may be 8.1 μm; the width W12 of the input waveguide 114 may be 0.5 μm.

In a fifth embodiment, the width W1 of the input waveguide 101 is 0.5 μm; the width W3 of the wide end surface of the first asymmetric tapered waveguide 102 is 2.2 μm, the width W2 of the narrow end surface of the first asymmetric tapered waveguide 102 is 0.5 μm, and the length L1 of the first asymmetric tapered waveguide 102 is 8.5 μm; the width W4 of the first straight waveguide 103 may be 2.2 μm, and the length L2 of the first straight waveguide 103 may be 5 μm; the width W5 of the wide end surface of the second asymmetric tapered waveguide 104 may be 2.2 μm, the width W6 of the narrow end surface of the second asymmetric tapered waveguide 104 may be 1.2 μm, and the length L3 of the second asymmetric tapered waveguide 104 may be 6.3 μm; the width W8 of the wide end face of the third asymmetric tapered waveguide 111 is 2.2 μm, the width W8.48 of the narrow end face of the third asymmetric tapered waveguide 111 is 1.2 μm, and the length L4 of the third asymmetric tapered waveguide 111 is 6.3 μm; the width W9 of the second straight waveguide 112 is 2.2 μm, and the length L5 of the second straight waveguide 112 is 5 μm; the width W10 of the wide end surface of the fourth asymmetric tapered waveguide 113 may be 2.2 μm, the width W11 of the narrow end surface of the fourth asymmetric tapered waveguide 113 may be 0.5 μm, and the length L6 of the fourth asymmetric tapered waveguide 113 may be 8.1 μm; the width W12 of the input waveguide 114 may be 0.5 μm.

As an example, the thickness of the first mode converter 10, the thickness of the second mode converter 11, and the thickness of the connecting arm 12 can be set according to actual needs. Preferably, the thickness of the first mode converter 10, the thickness of the second mode converter 11, and the thickness of the connecting arm 12 may all be from 215 nm to 225 nm. More preferably, in this embodiment, the thickness of the first mode converter 10, the thickness of the second mode converter 11, and the thickness of the connecting arm 12 are 220 nm.

Figure 6:
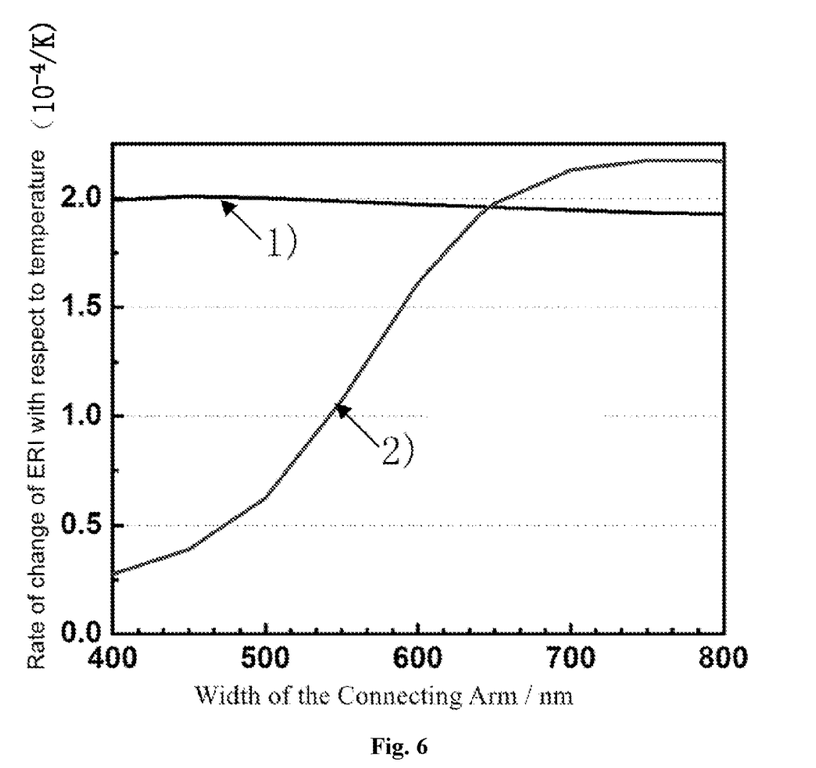
FIG. 6 is a rate-of-change-versus-width graph, wherein the "rate-of-change" refers to the rate of change of the effective refractive index (ERI) of different modes of incident light with respect to temperature, and the "width" refers to the width of a connecting arm of a temperature-insensitive Mach-Zehnder interferometer of the present disclosure; wherein the incident light in curve 1) is in TE0 mode, and the incident light in curve 2) is in TE1 mode.
Figure 7:
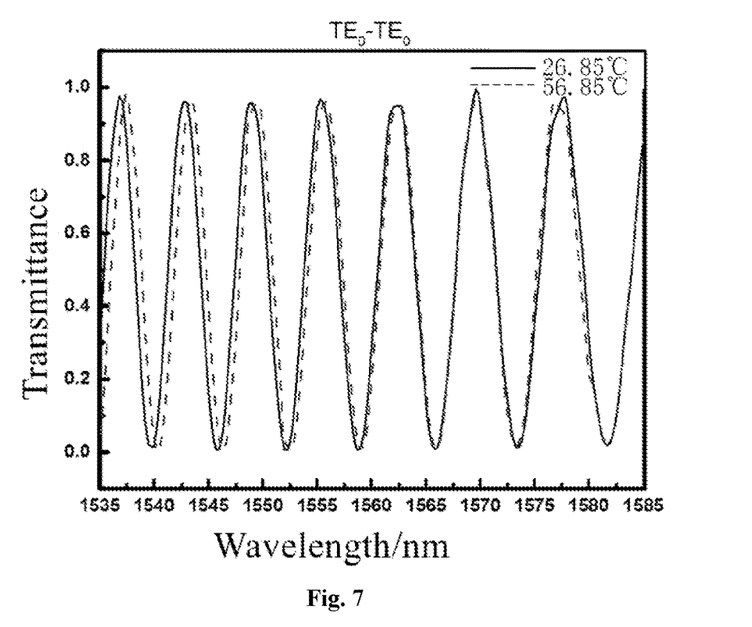
Figure 8:
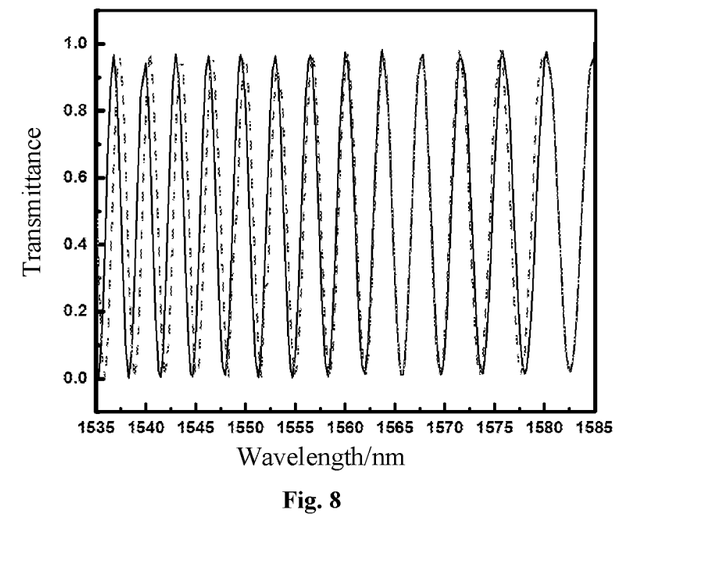
Figure 9:
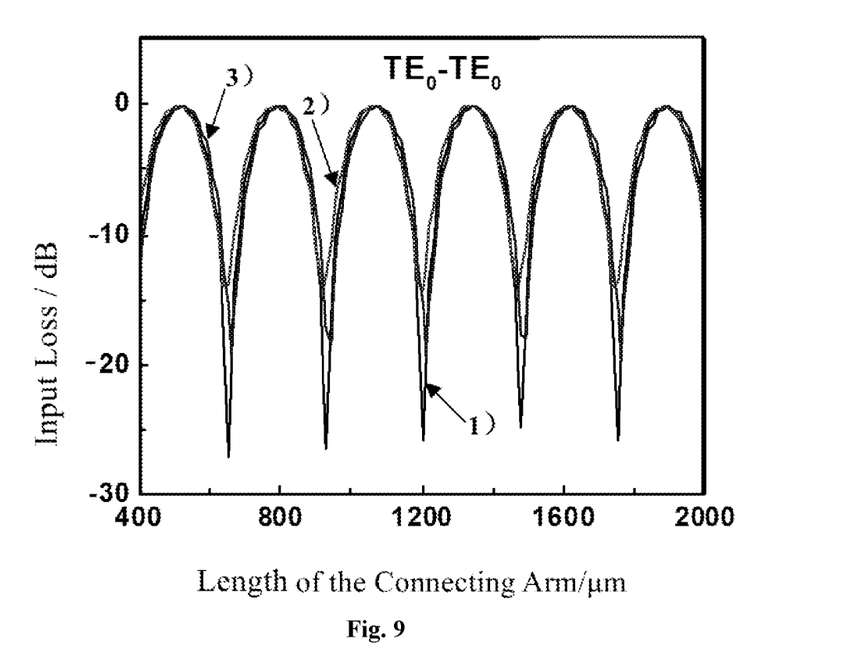
Figure 10:
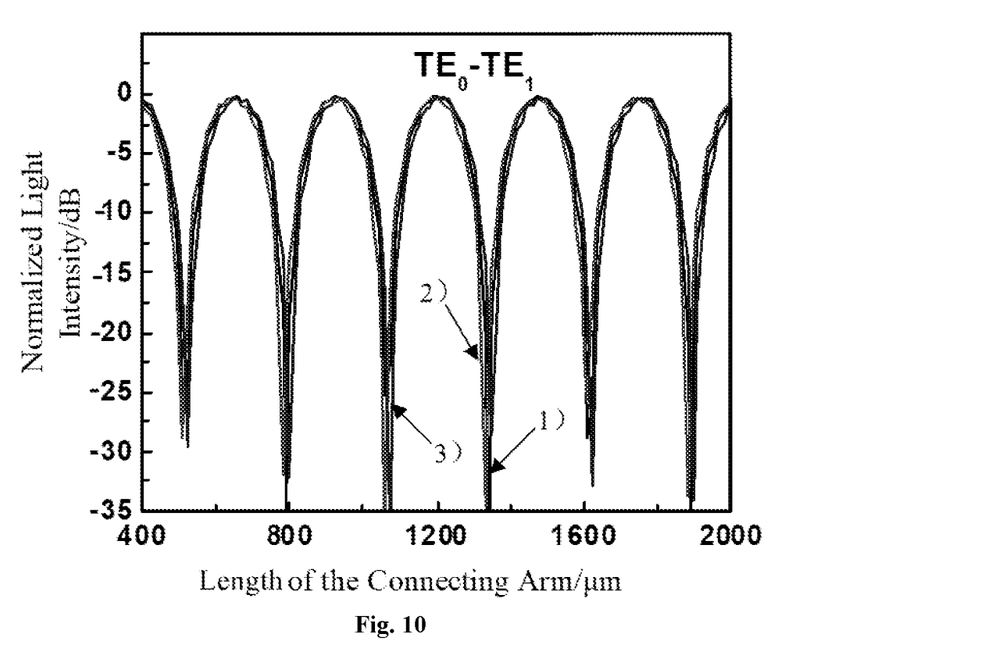
Figure 11:
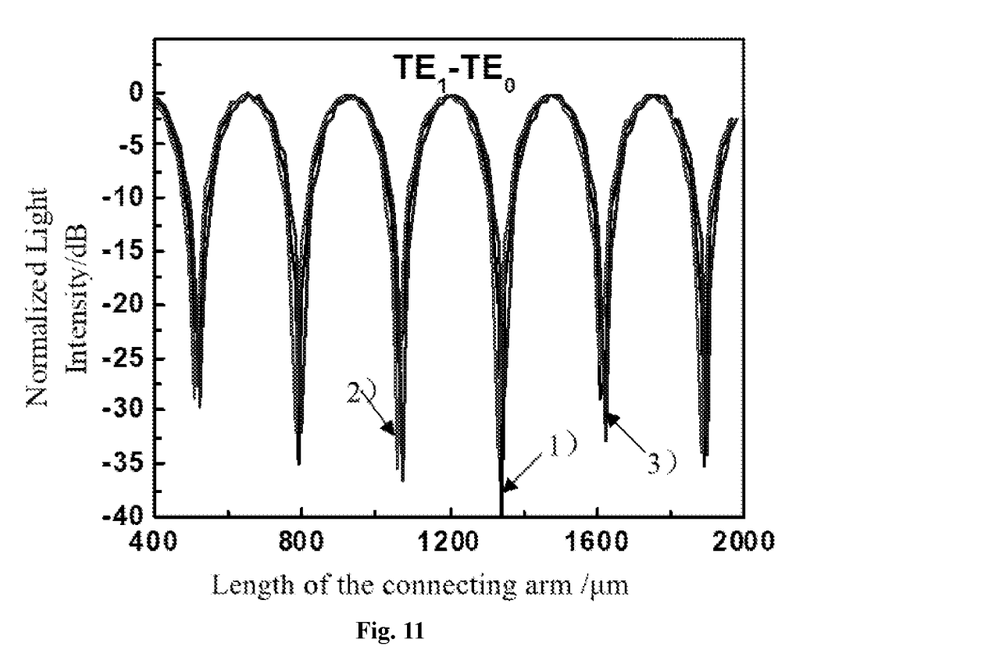
Figure 12:
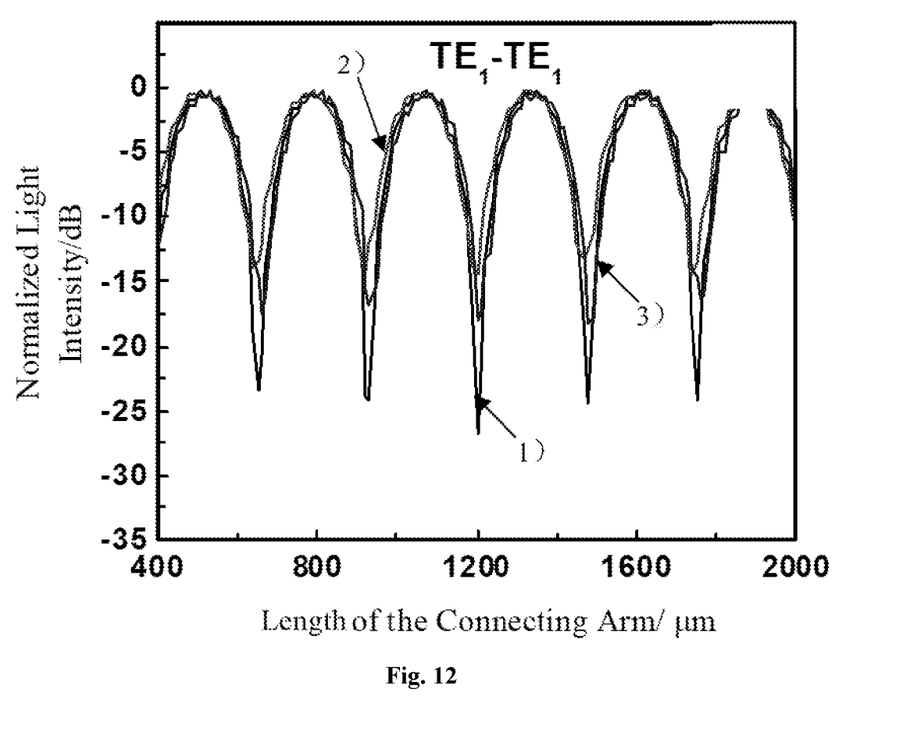

As an example, the width of the connecting arm 12 can be set according to actual needs. Preferably, the width of the connecting arm 12 is 646 nm. FIG. 6 is a rate-of-change-versus-width graph, wherein the "rate-of-change" refers to the rate of change of the effective refractive index of different modes of incident light with respect to temperature, and the "width" refers to the width of the connecting arm of the temperature-insensitive Mach-Zehnder interferometer of the present disclosure. When the two modes of incident light have the same effective refractive index with respect to the temperature change rate ($d_{n_{eff}}/dT$), the corresponding connecting arm 12 width is the connecting arm 12 width when the interferometer is not temperature sensitive. Please refer to FIGS. 7 and 8. It can be seen from FIGS. 7 and 8 that the temperature-insensitive Mach-Zehnder interferometer of the present disclosure has roughly the same performance at different temperatures, that is, the performance of the temperature-insensitive Mach-Zehnder interferometer is not greatly affected by temperature. That is, FIGS. 7 and 8 further prove that the temperature-insensitive Mach-Zehnder interferometer of the present disclosure is insensitive to temperature.

Please refer to FIGS. 9-12. It can be seen from FIGS. 9-12 that the temperature-insensitive Mach-Zehnder interferometer of the present disclosure can obtain light in of a mixed mode that includes both the TE0 mode and TE1 mode, regardless of whether the incident light is in the TE0 mode or TE1 mode. It can be seen from FIGS. 9 to 12 that the variations of the widths of the first straight waveguide 103 and the second straight waveguide 112 within the range of ±50 nm will not impact the performance of the temperature-insensitive Mach-Zehnder interferometer.

In summary, the present disclosure provides a temperature-insensitive Mach-Zehnder interferometer. The temperature-insensitive Mach-Zehnder interferometer includes: a first mode converter; a second mode converter located on one side of the first mode converter and with a distance from the first mode converter; and a connecting arm located between the first mode converter and the second mode converter, with one end of the connecting arm connected to the first mode converter, and the other end connected to the second mode converter; the connecting arm includes a straight waveguide connecting arm. The structure in the present disclosure's temperature-insensitive Mach-Zehnder interferometer is prepared based on an SOI substrate. Because the silicon in the SOI substrate has a large thermo-optical coefficient (up to $1.86 \times 10^{-4}$ RIU/K, wherein RIU is a unit of refractive index), which can cause a considerable wavelength shift (about 80 μm/K) that varies with temperature. On this basis, by setting parameters such as the width and thickness of the connecting arm, temperature insensitivity can be achieved. At the same time, the temperature-insensitive Mach-Zehnder interferometer of the present disclosure can be compatible with the CMOS process, which is convenient for mass production. The temperature-insensitive Mach-Zehnder interferometer of present disclosure can output light in both TE0 mode and TE1 mode regardless of the mode of the incident light. The two mode converters in the temperature-insensitive Mach-Zehnder interferometer of present disclosure are connected by the connecting arm, which has a simple structure and low loss. The width of the straight waveguide in the asymmetric tapered waveguide in the present disclosure temperature-insensitive Mach-Zehnder interferometer can be adjusted in a large range (±50 nm) without affecting the performance of the device, which facilitates high-quality mass production implemented on a silicon photonics process platform.

The above-mentioned embodiment only exemplarily illustrates the principle and effect of the present disclosure, and is not used to limit the present disclosure. Anyone familiar with this technology can modify or change the above embodiment without departing from the spirit and scope of the present disclosure. Therefore, all equivalent modifications or changes made by those with ordinary knowledge in the technical field without departing from the spirit and technical concepts disclosed in the present disclosure should still be covered by the attached claims of the present disclosure.

What is claimed is:

1. A temperature-insensitive Mach-Zehnder interferometer, comprising:
    a first mode converter, comprising: an input waveguide; a first asymmetric tapered waveguide; a first straight waveguide; and a second asymmetric tapered waveguide; wherein the input waveguide, the first asymmetric tapered waveguide, the straight waveguide, and the second asymmetric tapered waveguide are connected in sequence, and the second asymmetric tapered waveguide is connected with the connecting arm;
    a second mode converter, located on one side of the first mode converter and with a distance from the first mode converter, and comprising: a third asymmetric tapered waveguide; a second straight waveguide; a fourth asymmetric tapered waveguide; and an output waveguide; wherein the third asymmetric tapered waveguide, the second straight waveguide, the fourth asymmetric tapered waveguide, and the output waveguide are connected in sequence, and the third asymmetric tapered waveguide is connected with the connecting arm; and a connecting arm, located between the first mode converter and the second mode converter, wherein one end of the connecting arm is connected to the first mode converter, and the other end is connected to the second mode converter, wherein the connecting arm includes a straight waveguide connecting arm.

2. The temperature-insensitive Mach-Zehnder interferometer according to claim 1, wherein one end of the first asymmetric tapered waveguide is a narrow end face, the other end is a wide end face, the narrow end face of the first asymmetric tapered waveguide is connected to the input waveguide, and the wide end face of the first asymmetric tapered waveguide is connected to the first straight waveguide;

wherein one end of the second asymmetric tapered waveguide is a narrow end face, the other end is a wide end face, the wide end face of the second asymmetric tapered waveguide is connected to the first straight waveguide, and the narrow end face of the second asymmetric tapered waveguide is connected with the connecting arm;

wherein one end of the third asymmetric tapered waveguide is a narrow end face, the other end is a wide end face, the narrow end face of the third asymmetric tapered waveguide is connected to the connecting arm, and the wide end face of the third asymmetric tapered waveguide is connected to the second straight waveguide;

wherein one end of the fourth asymmetric tapered waveguide is a narrow end face, the other end is a wide end face, the wide end face of the fourth asymmetric tapered waveguide is connected to the second straight waveguide, and the narrow end face of the fourth asymmetric tapered waveguide is connected to the output waveguide.

3. The temperature-insensitive Mach-Zehnder interferometer according to claim 2, wherein the width of the wide end face of the first asymmetric tapered waveguide and the width of the wide end face of the second asymmetric tapered waveguide are the same as the width of the first straight waveguide, and the width of the wide end face of the third asymmetric tapered waveguide and the width of the wide end face of the fourth asymmetric tapered waveguide are the same as the width of the second straight waveguide.

4. The temperature-insensitive Mach-Zehnder interferometer according to claim 2, wherein the width of the input waveguide is 0.45 μm to 0.55 μm;

wherein the width of the wide end surface of the first asymmetric tapered waveguide is 2.1 μm to 2.2 μm, the width of the narrow end surface of the first asymmetric tapered waveguide is 0.45 μm to 0.55 μm, and the length of the first asymmetric tapered waveguide is 8.05 μm to 8.15 μm;

wherein the width of the first straight waveguide is 2.1 μm to 2.2 μm, and the length of the first straight waveguide is 4.95 μm to 5.05 μm;

wherein the width of the wide end surface of the second asymmetric tapered waveguide is 2.1 μm to 2.2 μm, the width of the narrow end surface of the second asymmetric tapered waveguide is 1.15 μm to 1.25 μm, and the length of the second asymmetric tapered waveguide is 6.25 μm to 6.35 μm;

wherein the width of the wide end surface of the third asymmetric tapered waveguide is 2.1 μm to 2.2 μm, the width of the narrow end surface of the third asymmetric tapered waveguide is 1.15 μm to 1.25 μm, and the length of the third asymmetric tapered waveguide is 6.25 μm to 6.35 μm;

wherein the width of the second straight waveguide is 2.1 μm to 2.2 μm, and the length of the second straight waveguide is 4.95 μm to 5.05 μm;

wherein the width of the wide end face of the fourth asymmetric tapered waveguide is 2.1 μm to 2.2 μm, the width of the narrow end face of the fourth asymmetric tapered waveguide is 0.45 μm to 0.55 μm, and the length of the fourth asymmetric tapered waveguide is 8.05 μm to 8.15 μm;

wherein the width of the input output waveguide is 0.45 μm to 0.55 μm.

5. The temperature-insensitive Mach-Zehnder interferometer according to claim 1, wherein the thickness of the first mode converter, the thickness of the second mode converter, and the thickness of the connecting arm are all 215 nm to 225 nm.

6. The temperature-insensitive Mach-Zehnder interferometer according to claim 1, further comprising a first inverted tapered coupler and a second inverted tapered coupler;

wherein the first inverted tapered coupler includes two input ends and an output end, and the output end of the first inverted tapered coupler is connected with an end of the first mode converter that is away from the connecting arm;

wherein the second inverted tapered coupler includes an input end and two output ends, and the input end of the second inverted tapered coupler is connected to an end of the second mode converter that is away from the connecting arm.

7. The temperature-insensitive Mach-Zehnder interferometer according to claim 1, further comprising a substrate, wherein the substrate comprises a bottom silicon layer and a buried oxide layer in an SOI substrate, wherein the first mode converter, the connecting arm and the second mode converter are all formed by etching a top silicon layer in the SOI substrate.

8. The temperature-insensitive Mach-Zehnder interferometer according to claim 7, further comprising a protective layer disposed on a top surface of the buried oxide layer, and the protective layer covers the first mode converter, the connecting arm, and the second mode converter.

9. The temperature-insensitive Mach-Zehnder interferometer according to claim 1, wherein the width of the connecting arm is 646 nm.

* * * * *